United States Patent [19]

Langenfeld et al.

[11] Patent Number: 4,915,575
[45] Date of Patent: * Apr. 10, 1990

[54] MATERIAL HANDLING ATTACHMENT FOR A TRACTOR HAVING A MULTIPLE-POINT HITCH ASSEMBLY

[75] Inventors: Joseph W. Langenfeld; Neal W. Westendorf, both of Onawa, Iowa

[73] Assignee: Westendorf Mfg. Co., Inc., Onawa, Iowa

[*] Notice: The portion of the term of this patent subsequent to May 24, 2005 has been disclaimed.

[21] Appl. No.: 814,043

[22] Filed: Dec. 27, 1985

[51] Int. Cl.⁴ .............................................. B66F 9/00
[52] U.S. Cl. .................................... 414/703; 172/445; 280/461.1; 414/920
[58] Field of Search ............... 414/703, 723, 680, 697, 414/700, 920, 685; 280/461 R, 461 A, 460 R, 460 A; 172/445

[56] References Cited

U.S. PATENT DOCUMENTS

| 2,624,481 | 1/1953 | Richey | 414/703 |
| 2,760,284 | 8/1956 | Cook | 414/703·X |
| 2,772,798 | 12/1956 | McClenny | 414/703 X |
| 3,127,999 | 4/1964 | Gostomski | 414/703 |
| 3,528,685 | 9/1970 | Eastman | 280/461 A X |
| 4,024,974 | 5/1977 | Hodge | 414/699 |
| 4,324,525 | 4/1982 | Lane et al. | 414/699 |
| 4,746,254 | 5/1988 | Langenfeld et al. | 414/703 |
| 4,753,568 | 6/1988 | Langenfeld et al. | 414/703 |

FOREIGN PATENT DOCUMENTS 1223760 8/1966 Fed. Rep. of Germany ...... 414/703

Primary Examiner—Robert J. Spar
Assistant Examiner—Donald W. Underwood
Attorney, Agent, or Firm—Zarley, McKee, Thomte, Voorhees & Sease

[57] ABSTRACT

A material handling attachment such as a bucket or the like is pivotally secured to the three-point hitch assembly of the tractor. The hitch assembly is movable between a lower position and an upper position by means of standard equipment on the tractor. A mechanical linkage interconnects the bucket, hitch assembly and the tractor so that the bucket will be in a substantially level position when the hitch assembly is in its lowermost position. As the hitch assembly is moved upwardly relative to the tractor, the linkage maintains the bucket in a level position. When the hitch assembly reaches its uppermost position, the linkage causes the bucket to be moved to a dumping position. After the material in the bucket has been dumped therefrom, the three-point hitch assembly is lowered with the bucket being automatically re-set to its operative or working position.

3 Claims, 5 Drawing Sheets

MATERIAL HANDLING ATTACHMENT FOR A TRACTOR HAVING A MULTIPLE-POINT HITCH ASSEMBLY

BACKGROUND OF THE INVENTION

This invention relates to a material handling attachment for a tractor and more particularly to a material handling attachment for a tractor having a three-point hitch assembly.

Many types of tractor loaders or front-end loaders for tractors have been previously provided. Conventional tractor loaders normally include a frame assembly secured to the tractor frame with a pair of hydraulically controlled boom arms pivotally secured to the tractor frame. A bucket, forklift, etc. is normally attached to the forward ends of the boom arms and is also hydraulically controlled. The conventional tractor loaders are normally quite large and are expensive.

Many of the tractors available today have what is known as the three-point hitch assembly secured to the rearward end thereof. The three-point hitch assemblies normally include an upper arm and a pair of lower arms with either the upper arm or the pair of lower arms being connected to some sort of internal mechanism such as a hydraulic cylinder or the like to cause the hitch assembly to be vertically moved with respect to the tractor. The three-point hitch assemblies normally accommodate implements such as blades, disks, plows, etc. Attempts have been made in the past to mount material handling equipment such as a loader bucket or forklift to the three-point hitch assemblies but is believed that all of the previous attempts have utilized hydraulic cylinders pivotally connected to the buckets or forklifts to cause the pivotal movement of the material handling equipment relative to the three-point hitch assembly. The utilization of a hydraulic cylinder results in the need for quick couplers, hydraulic hoses, etc. in addition to the hydraulic cylinder itself. The addition of the couplers, hoses and cylinder adds considerably expense to the equipment and frequently results in oil leaks occurring. Additional controls are also required to cause the pivotal movement of the material handling equipment relative to the three-point hitch assembly.

It is therefore a principal object of the invention to provide a material handling attachment for a tractor having a three-point hitch assembly.

A further object of the invention is to provide a material handling attachment for a tractor which includes self-leveling and automatic dumping features.

Still another object of the invention is to provide a material handling attachment for a three-point hitch assembly which does not require the need for additional couplers, hoses, cylinder, valves, etc.

Still another object of the invention is to provide a material handling attachment for a tractor which has an improved cycle speed.

Yet another object of the invention is to provide a material handling attachment for a tractor which has an automatic re-set feature after the bucket has been automatically moved to its dumping position.

Still another object of the invention is to provide a material handling attachment for a tractor which utilizes only one control lever, namely, the control lever for the three-point hitch assembly.

Still another object of the invention is to provide a material handling attachment for a tractor which is easily and quickly mounted on the three-point hitch assembly and quickly and easily removed therefrom.

Yet another object of the invention is to provide a material handling attachment for a tractor having less loader frame weight than in conventional devices since a hydraulic cylinder is not needed to pivotally move the loader bucket relative to the three-point hitch.

Still another object of the invention is to provide a device of the type described which is economical of manufacture and durable in use.

These and other objects will be apparent to those skilled in the art.

SUMMARY OF THE INVENTION

Figure 1:
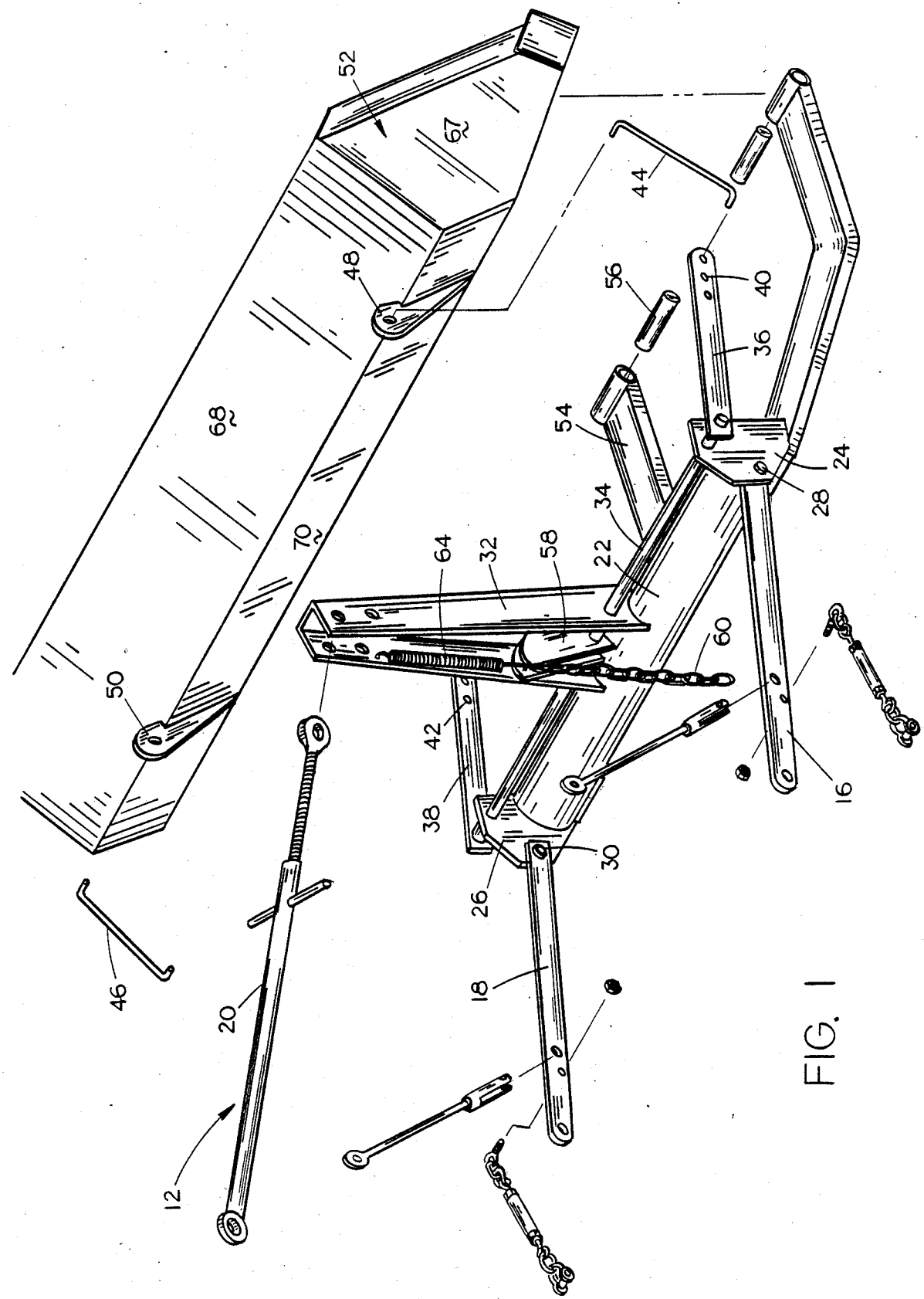
FIG. 1 is a front exploded perspective view of the attachment of this invention.

A material handling attachment such a bucket or the like is pivotally secured a three-point hitch assembly of a tractor. The hitch assembly is vertically movable between a lower position and a upper position by means of the standard equipment on the tractor. A mechanical linkage means interconnects the bucket, hitch assembly and the tractor in such a manner so that when the three-point hitch assembly is in its lower position, the bucket will be in a substantially level position. As the three-point hitch assembly is moved upwardly relative to the tractor, the linkage means maintains the bucket in a level position. When the three-point hitch assembly reaches its upper position, the linkage means causes the bucket to be moved to a dumping position. After the material in the bucket has been dumped therefrom, the three-point hitch assembly is lowered with the bucket being automatically re-set to its operative or working position.

DESCRIPTION OF THE PREFERRED EMBODIMENT

Although the material handling attachment described herein is preferably a loader bucket, other attachments could be substituted therefor such as a forklift or the like. Additionally, the three-point hitch assembly is described herein as being located on the rearward end of the tractor as is the general rule, it should be understood that the hitch assembly could also be mounted on the front end of the tractor.

The numeral 10 refers to a conventional tractor which has a vertically movable three-point hitch assembly 12 at either its forward or rearward end and which is commonly referred to as a multiple-point or three-point hitch. The bucket assembly of this invention is designated by the reference numeral 14 and is designed to be secured to the three-point hitch assembly of the conventional tractor whether the three-point hitch assembly is mounted on the rearward or forward ends of the tractor. Whether the hitch assembly is mounted on the forward or the rearward end of the tractor, the three-point hitch assembly will normally include a pair of lower link arms 16 and 18 and an upper link arm 20. The conventional tractor 10 includes means for vertically moving the hitch assembly in conventional fashion.

Bucket assembly 14 includes a horizontally disposed support 22 which has brackets 24 and 26 positioned at its opposite ends respectively. Brackets 24 and 26 are pivotally connected to the ends of link arms 16 and 18 by pins 28 and 30 respectively. Upstanding post 32 is secured to support 22 and has a shaft or rod 34 rotatably mounted thereon which extends laterally from both sides thereof. Shaft 34 is rotatably received in brackets 24 and 26 and has lever arms or links 36 and 38 connected to its ends for rotation therewith.

As seen in the drawings, arm 36 has a plurality of openings 40 formed therein while arm 38 has a plurality of openings 42 formed therein. One end of link 44 is pivotally received in one of the openings 40 in arm 36 and one end of link 46 is pivotally received by one of the openings 42 in arm 38. The other ends of links 44 and 46 are pivotally secured to brackets 48 and 50 which are secured to bucket 52. The forward end of arm 54 is secured to support 22 by welding or the like. The rearward end of arm 54 is secured to bucket 52 by removable pin 56.

Cam 58 is secured to shaft 34 within post 32 for rotation with shaft 34. One end of chain 60 is secured to the upper end of cam 58 as seen in the drawings. The other end of chain 60 is secured to the tractor drawbar 62 or some other portion of the tractor as will be described in more detail hereinafter. Spring 64 is secured at its upper end to post 34 and is secured at its lower end to cam 58 for yieldably resisting the downward pivotal movement of cam 58.

Figure 2:
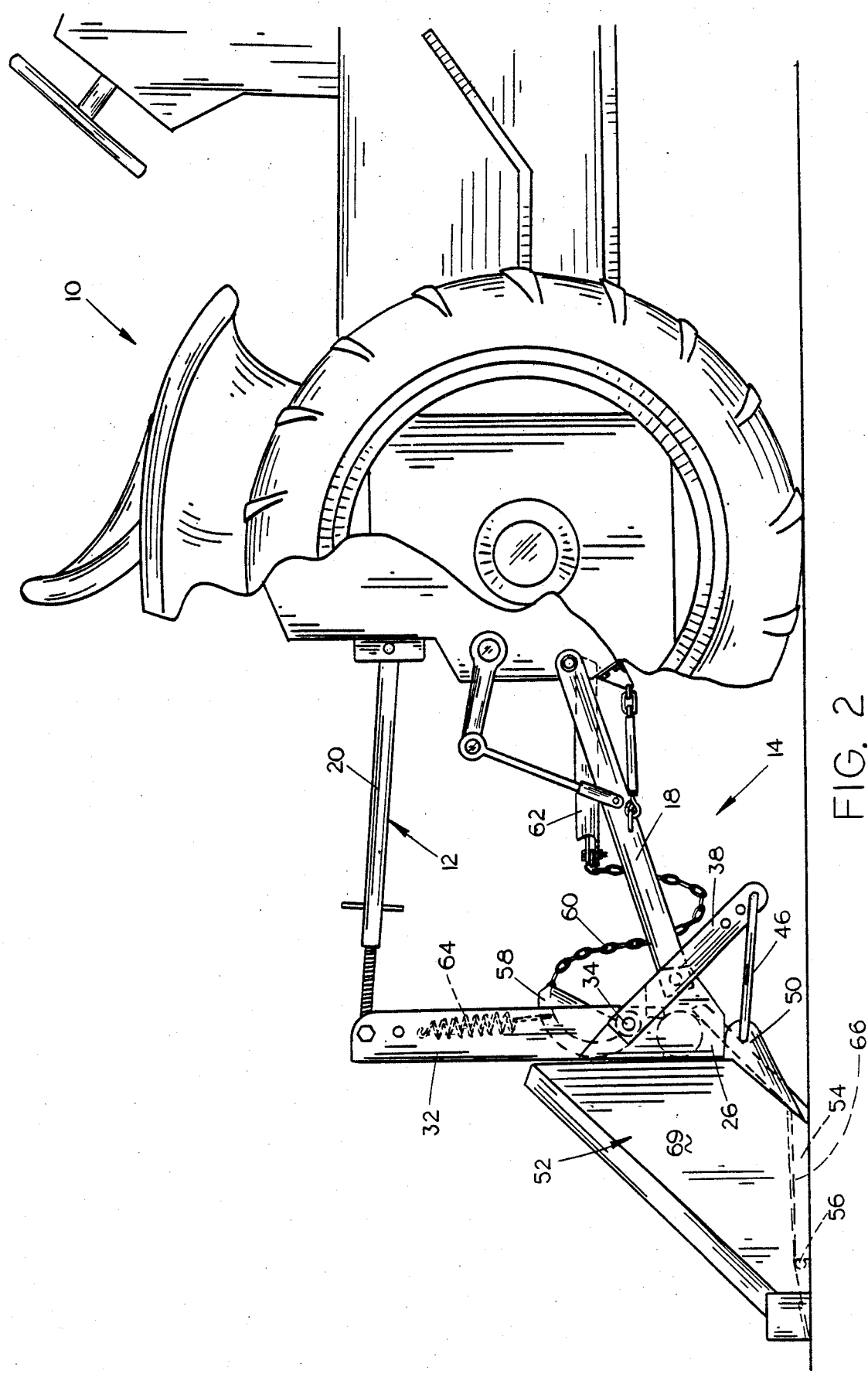
FIG. 2 is a side elevational view of the attachment of this invention mounted on a tractor illustrating the attachment in its lowermost position.
Figure 3:
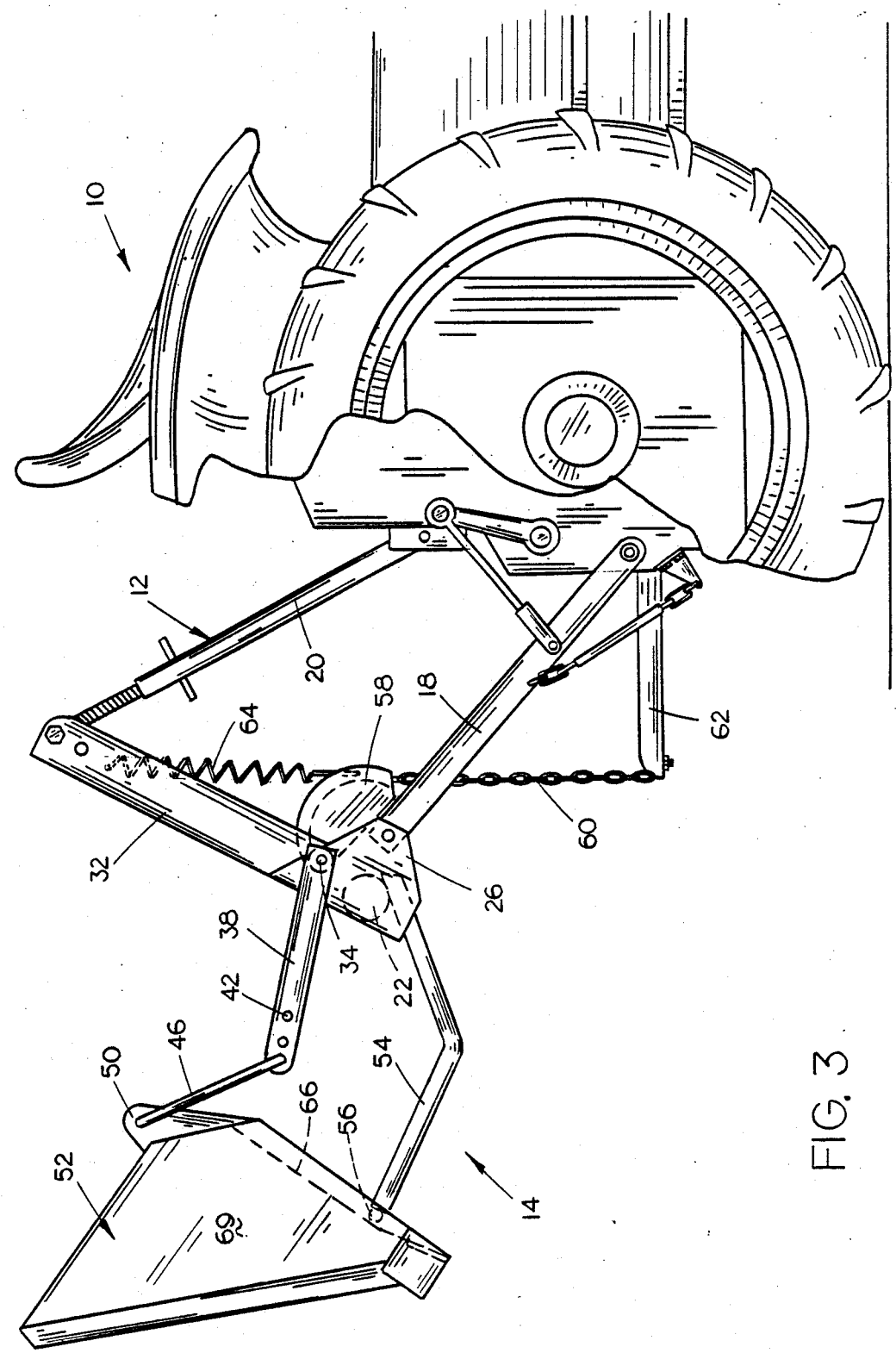
FIG. 3 is a view similar to FIG. 2 except that the attachment has been moved upwardly from the position of FIG. 2 and has been moved to its dumping position.

For purposes of description, bucket 52 will be described as including a bottom portion 66 which is horizontally disposed when the hitch assembly of the tractor is in its lowermost position as illustrated in FIG. 2. Bucket 52 also includes side walls 67 and 69 having back wall portions 68 and 70 extending therebetween.

Figure 4:
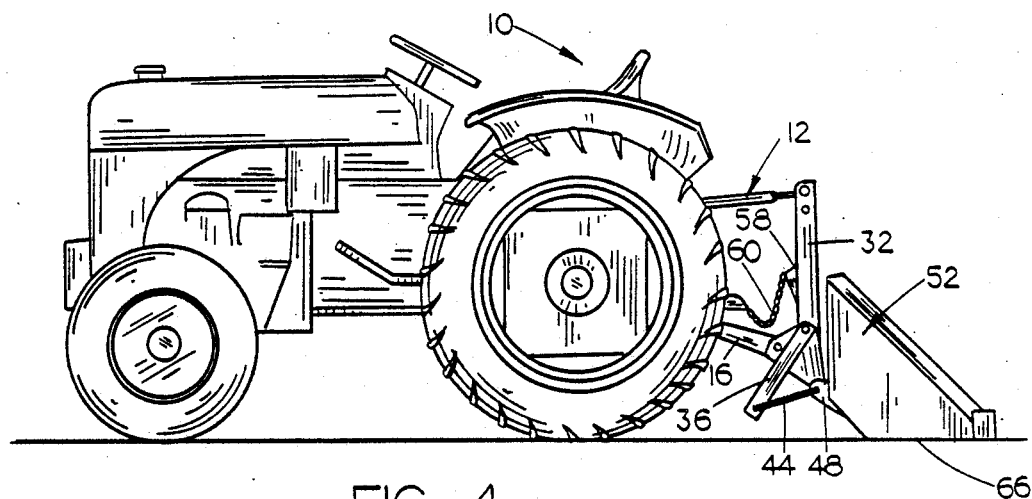
FIG. 4 is a side view of the loader bucket of this invention mounted on a tractor.
Figure 5:
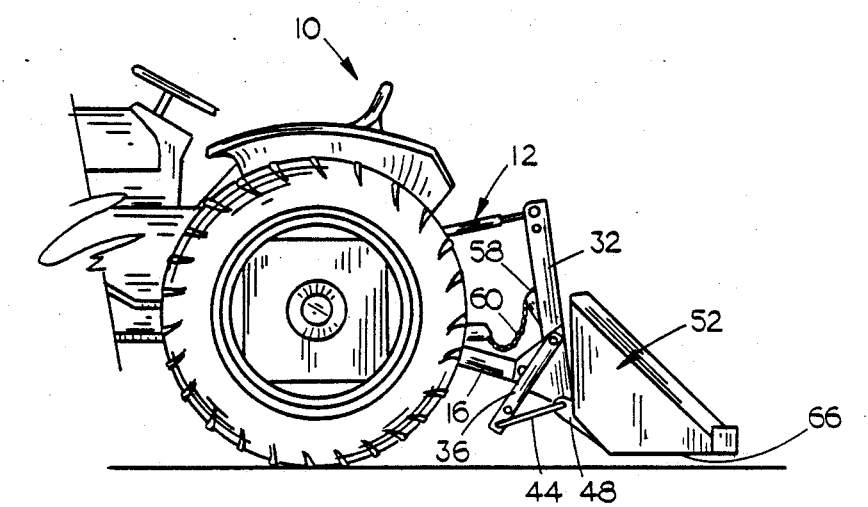
FIG. 5 is a view similar to FIG. 4 except that the loader bucket has been moved upwardly from the ground.
Figure 6:
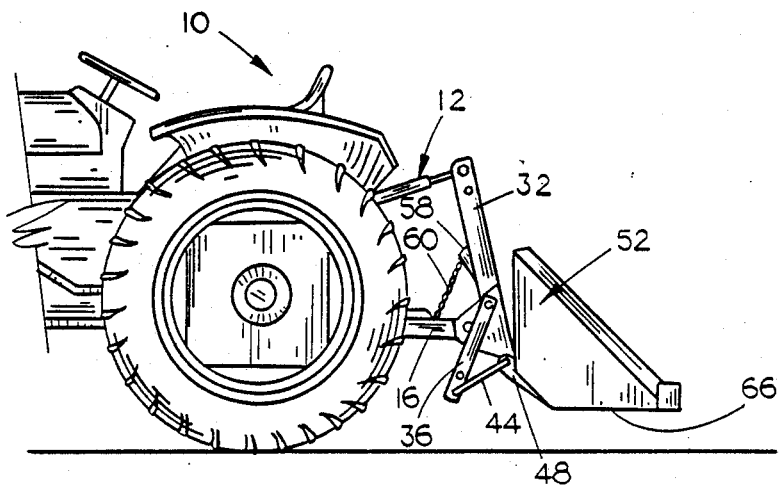
FIG. 6 is a view similar to FIGS. 4 and 5 except that the bucket has been moved upwardly from the position of FIG. 5 and illustrating the manner in which the bucket is maintained in a level condition as it is being vertically moved.
Figure 7:
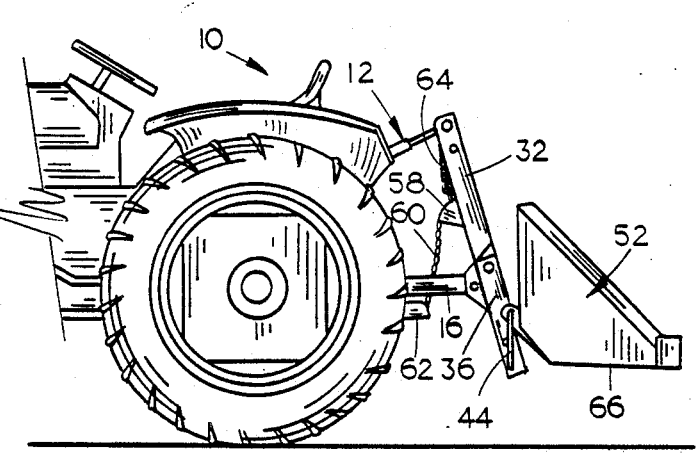
FIG. 7 is a view similar to FIGS. 4–6 except that the bucket has been vertically moved upwardly.
Figure 8:
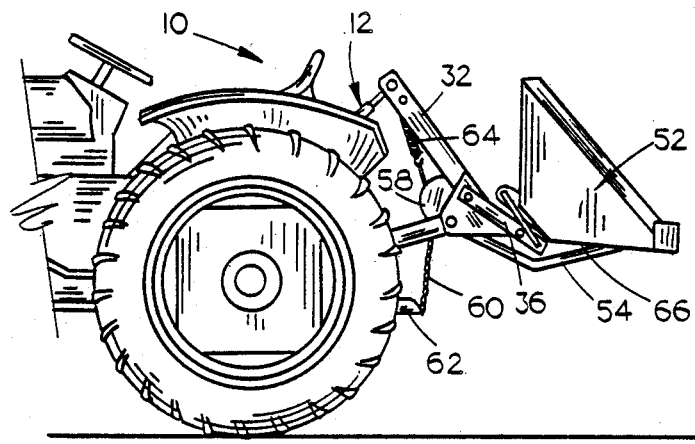
FIG. 8 is a view similar to FIGS. 4–7 except that the bucket is shown as it begins to dump.
Figure 9:
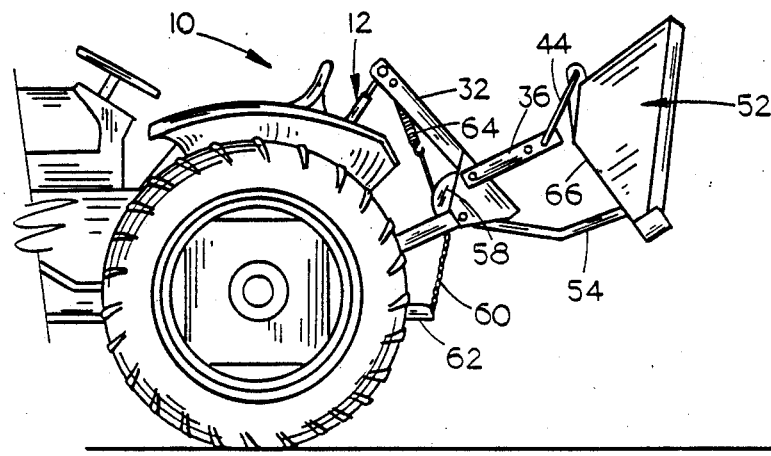
FIG. 9 is a view similar to FIGS. 4–8 but which illustrates the bucket in its dumping position.

In FIG. 4, the bucket 52 is illustrated in its lowermost position as is the three-point hitch assembly 12. When it is desired to move dirt or the like, the bucket 52 may be positioned as in FIG. 4 or any position thereabove such as illustrated in FIGS. 5, 6 or 7. The tractor is backed so that the bucket 52 is filled with the material to be transported. When the bucket has been filled, the tractor is driven to the location where the material is to be dumped or deposited. Continued vertical movement of the hitch assembly 12 from the position of FIG. 4 causes the bottom of the bucket to remain level as illustrated in FIGS. 4–7. The bucket is pivoted in a clockwise direction relative to the hitch assembly 12 as the hitch assembly 12 is vertically moved upwardly from the position of FIG. 4 to the position of FIG. 5. The clockwise rotation or pivotal movement of the bucket 52 is caused by the chain 60 causing cam 58 to rotate as the hitch assembly is moved upwardly relative to the ground. Rotation of the cam 58 causes the rearward ends of the arms 36 and 38 to be moved upwardly which in turn causes the links 44 and 46 to pivot the bucket 52 in a clockwise direction. The relationship of the arms 36, 38 and the links 44 and 46 with respect to the brackets 48 and 50 prevents the bucket from dumping until the links 44 and 46 have moved from their "off-center" position of FIGS. 4–8. When the links 44 and 46 reach the position of FIG. 9, the bucket 52 freely tips into its dumping position.

When the material in the bucket has been dumped therefrom, the tractor operator lowers the hitch assembly 12. As the hitch assembly 12 is lowered, spring 44 causes cam 58 to pivotally move upwardly so that the arms 36 and 38 will be pivotally moved downwardly to move the bucket 52 back into its working position of FIG. 4. The bucket 52 can also be positioned in its working position without the aid of the spring 64 by simply lowering the bucket into ground engagement and driving the tractor slightly forwardly to again return the links 44 and 46 to their "off-center" position to mechanically lock the bucket 52 in its working position. The bucket 52 can also be used in its open or dumping position as a pusch blade.

The attachment of this invention enables a bucket or the like to be mounted on a conventional three-point hitch assembly of a tractor without the requirement of additional couplers, valves, hoses, or hydraulic cylinder being required. The attachment is quickly and easily removed from the tractor by simply removing three pins. When the bucket is positioned on the rearward end of the tractor, the weight of the material in the bucket provides additional traction to the tractor especially those tractors with two-wheel, rear drive. Although the attachment is preferably suited for use with a loader bucket, a forklift or the like could be substituted therefor.

Thus it can be seen that a novel attachment has been described for use with a three-point hitch of a tractor which permits the operation of the attachment to be controlled by the control which is used to control the three-point hitch of the tractor. The attachment may be cycled quickly since the operator will not be required to operate an additional hydraulic cylinder which is normally required on conventional arrangements. The instant invention not only provides a relatively inexpensive means for securing a loader bucket or the like to a hitch assembly of a tractor but it also provides an assembly which may be easily and quickly mounted on the tractor or removed therefrom. The elimination of the costly hydraulic cylinder for controlling the pivotal movement of the bucket is very important. In addition, the elimination of a hydraulic cylinder for pivoting the bucket also results in that a recess is not required in the back wall of the bucket which is needed in conventional devices of the general type described due to the fact that space must be provided for accommodating the hydraulic cylinder causing the open portion of the bucket to be divided into two chambers.

Thus it can be seen that the invention accomplishes at least all of its stated objectives.

We claim:
1. In combination, a tractor having a vertically movable three-point hitch assembly provided thereon, said hitch assembly being movable between a lower position and an upper position, a materials handling bucket pivotally secured to said three-point hitch assembly for vertical movement therewith, said bucket being movable between working and dumping positions, and mechanical linkage means interconnecting said bucket, said hitch assembly and said tractor which positions said bucket in its working position when said hitch assembly is in its said lower position and which causes said bucket to dump as said hitch assembly moves to its upper position from a position slightly lower than its said upper position, said hitch assembly comprising first and second lower link arms and an upper link arm, said link arms having rearward and forward ends, said mechanical linkage means comprising, an elongated horizontally disposed support positioned transversely with respect to the longitudinal axis of the tractor and having opposite ends, an upstanding post means secured at its lower end to said support at the center of said support, the rearward ends of said first and second lower link arms being pivotally secured to the opposite ends of said support, the rearward end of said upper link arm being pivotally secured to said upstanding post means adjacent the upper end thereof, a horizontally disposed shaft operatively rotatably mounted on said support and being parallel thereto, an actuator means mounted on said shaft to cause the rotation of said shaft, connection means extending between said actuator means and a fixed point on said tractor whereby upward movement of said hitch assembly will cause said shaft to be rotated, by said actuator means in a first direction, first and second arms rigidly secured to the opposite ends of said shaft and extending rearwardly therefrom, first and second spaced-apart support arms rigidly secured to said support and extending rearwardly therefrom, the rearward ends of said first and second support arms being pivotally secured to said bucket, first and second elongated links pivotally secured at one end to the rearward ends of said first and second arms respectively, the other ends of said links being pivotally secured to said bucket, the relationship of said bucket, links, arms and support arms being such that said bucket cannot be pivotally moved to its dumping position when said hitch assembly is in its said working position and will remain so until said hitch assembly is raised to a predetermined height relative to the tractor.

2. The combination of claim 1 wherein said actuator means comprises a cam actuator.

3. The combination of claim 1 wherein a spring means interconnects said actuator means and said post means for yieldably resisting the rotation of said shaft in said one direction.

* * * * *